C. GERSON.
Filtration.
No. 201,516. Patented March 19, 1878.
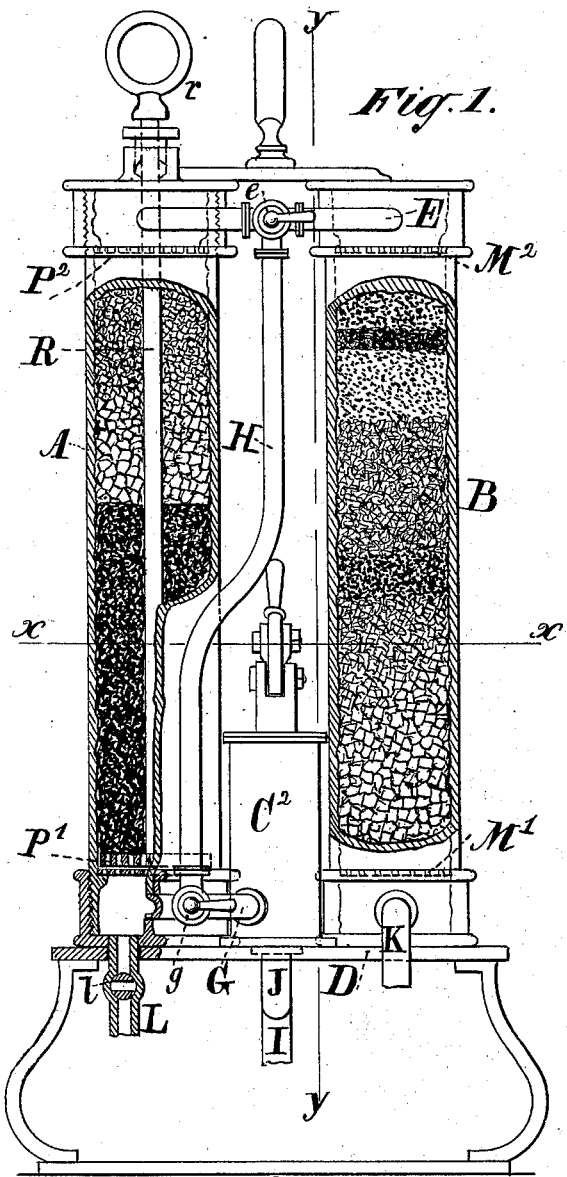
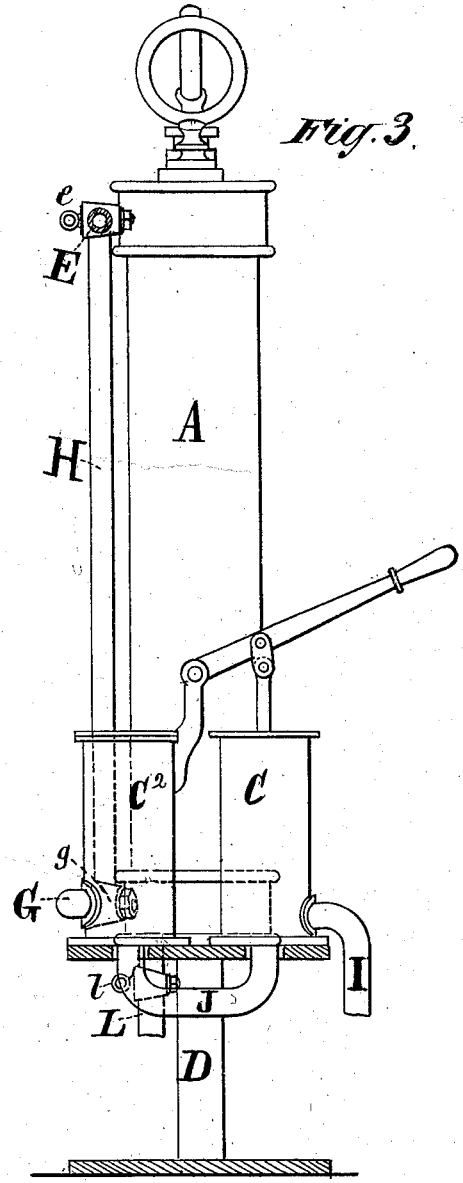
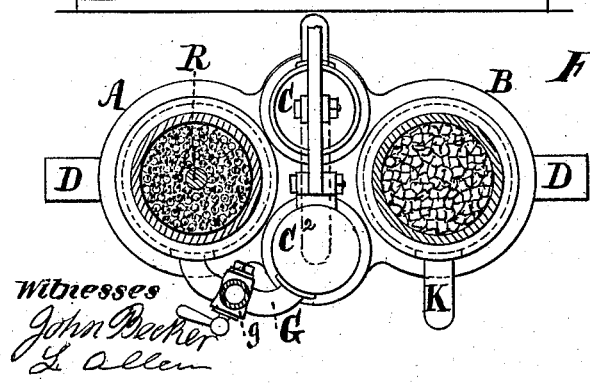
Inventor
Ceasar Gerson
By Brown + Allen
Attys.

UNITED STATES PATENT OFFICE.

CEASAR GERSON, OF HAMBURG, GERMANY.

IMPROVEMENT IN FILTRATION.

Specification forming part of Letters Patent No. 201,516, dated March 19, 1878; application filed January 12, 1878.

*To all whom it may concern:*

Be it known that I, CEASAR GERSON, M. D., of Hamburg, in the Empire of Germany, have invented certain Improvements in Filtration for Water and other Liquids; and I do hereby declare that the following is a full, clear, and exact description of the same, sufficient to enable those skilled in the art to which my invention appertains to make and use the same.

My invention, which is applicable to public water-works, for use in manufactories, hotels, hospitals, and other public buildings, also by armies in camp or in barracks, and for domestic use in private dwellings, more particularly relates to a process of double filtration; and consists in a novel method of filtration within two vessels containing certain prepared materials. The first vessel contains sponges and pumice-stone, of different degrees of fineness, both impregnated with a solution of salt of iron. The second vessel contains Swedish iron ore, layers of sand of different degrees of fineness, (or powdered glass instead of sand,) together with wool shearings and pumice-stone, both impregnated with salt of iron.

The sponges are prepared as follows: They are first immersed in a weak solution of iron salt. At present I use sulphate of iron and sesquichloride of iron; but I reserve the right to employ any other suitable soluble iron salt. They remain in this solution from four to eight days until they are endosmotically impregnated on the interior surfaces of the tubes with the iron salts, after which they are carefully washed, in order to remove the adherent crystals. They are then placed in a still weaker solution of tannic acid, remaining there for about a week, after which they are washed, so as to remove the adherent particles of tannic acid, and leave only tannate of iron, preserving the sponges from putrefaction and development of organic impurities.

The preparation of the pumice-stone is similar to that of the sponges, except that it lasts longer, and is partially repeated. It is first placed in a solution of sulphate of iron, remaining there from eight to ten days, after which it is carefully washed. It is next placed in a weak solution of tannic acid for from eight to ten days; then in a weaker solution of sesquichloride of iron for from six to eight days, and then again in tannic acid.

I reserve the right to employ any other suitable process which may be found to operate more expeditiously.

The two vessels containing the filtering materials, prepared as above described, are arranged on a suitable frame-work, and connected with each other and with a force-pump by means of pipes furnished with cocks or valves. The force-pump receives the water through a suction-pipe, and forces it upward through the first vessel; thence through the second vessel, from which it may be drawn through an outlet-pipe.

The accompanying drawings illustrate a mode of carrying out my invention.

Figure 1 is a central vertical section of an apparatus embodying my improvements. Fig. 2 is a horizontal section taken in the line $x\ x$ of Fig. 1. Fig. 3 is a vertical section taken in the line $y\ y$ of Fig. 1.

A represents the first vessel, B the second vessel, and C $C^2$ the pump, all of which are supported by a platform or frame-work, D, the pump being located between the two vessels.

E is a pipe connecting the vessels A and B with each other at their upper portions, above the filtering material.

G is a pipe connecting the air-chamber $C^2$ of the pump with the lower portion of the vessel A, and H is a pipe connecting the pipes E and G with each other. The pipes E and G are provided with three-way cocks $e$ and $g$ at the point of junction of said pipes with the pipe H. I is a suction-pipe leading into the cylinder C of the pump, and J is a pipe leading from said cylinder to the air-chamber $C^2$.

K is an outlet-pipe leading from the vessel B, and L is an outlet-pipe leading from the vessel A, the pipe L being provided with a two-way cock, $l$.

$M^1\ M^2$ represent two perforated plates, arranged in the vessel B, one near the bottom and the other near the top, so as to leave a space between each plate and the end of the vessel.

$P^1\ P^2$ represent two similar plates, similarly arranged in the vessel A, the lower plate $P^1$ being movable, and attached to the lower end of a rod, R, which passes upward through the upper plate P², and extends outside of the vessel A, where it is provided with a handle, r.

The vessel A contains sponges and pumice-stone, of different degrees of fineness, both impregnated with a solution of salt of iron, as before described. The vessel B contains Swedish iron ore, layers of sand of different degrees of fineness, (or powdered glass instead of sand,) together with wool shearings and pumice-stone, both impregnated with salt of iron.

In using this apparatus, the water enters the pump through the suction-pipe I. If both vessels are to be used, the cocks e and g are so turned as to cut off communication with the pipe H. The pump then forces the water through the pipe G, and upward through the vessel A and the filtering material contained therein; thence through the pipe E to the vessel B, and downward through the same and through the filtering material contained therein, and out through the outlet-pipe K. When the water has passed through the first vessel A, it is fit for use for washing, bathing, &c., and after passing through the second vessel B, it is sufficiently purified to be fit for drinking. If only the first vessel A is to be used, the cocks e and g may be turned so as to cut off communication with the vessel B and the bottom of the vessel A. The pump will then force the water upward through the pipe H and downward through the vessel A, from which it may be drawn through the pipe L by opening the valve l; or the vessel A or pipe H may be provided with an outlet-pipe and valve, in which case the valve g may be turned as in the first instance, when the water will be forced upward through the vessel A, and pass out through said outlet-pipe.

The vessel A may be cleaned by passing water through it in the reverse of the ordinary direction, and by alternately raising and lowering the rod R while the current of water is passing through it. By this means the sponges and filtering materials are alternately squeezed or compressed and loosened or expanded, and the impurities are thoroughly washed out.

In water-works and large establishments where water is filtered for drinking purposes the water is first passed through vessels containing sponges and pumice-stone, both impregnated with salts of iron, and then filtered through open basins, reservoirs, or tanks containing, to a thickness of about three feet, Swedish iron ore, sand, and pumice-stone, partly pure and partly impregnated with salt of iron. These reservoirs are capable of delivering more water than the sand-filter reservoirs commonly in use, because the surface need not be so great, and they will not require so much cleaning, because most of the impurities will remain in the high-pressure vessels.

The construction and arrangement of the vessels herein described may be somewhat modified, so that the apparatus may be placed on a carriage, and thus be readily transferred from place to place. This form of the apparatus is suitable for the use of armies in the field or in camp or barracks.

What I claim as new, and desire to secure by Letters Patent, is—

The method of filtration within two vessels, the first containing sponges and pumice-stone prepared with iron salt and tannic acid, and the second containing Swedish iron ore and sand or powdered glass, all substantially as herein described.

C. GERSON, Dr.

Witnesses:
A. MEYER,
P. CALLOT.